US012688616B2

(12) United States Patent
Zheng

(10) Patent No.: US 12,688,616 B2
(45) Date of Patent: Jul. 21, 2026

(54) IMAGE PROCESSING METHOD, CLOUD SERVER, VR TERMINAL AND STORAGE MEDIUM

(71) Applicant: ZTE CORPORATION, Shenzhen (CN)

(72) Inventor: Zhengshi Zheng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 193 days.

(21) Appl. No.: 18/702,924

(22) PCT Filed: Oct. 9, 2022

(86) PCT No.: PCT/CN2022/124175
§ 371 (c)(1),
(2) Date: Apr. 19, 2024

(87) PCT Pub. No.: WO2023/066054
PCT Pub. Date: Apr. 27, 2023

(65) Prior Publication Data
US 2024/0420373 A1       Dec. 19, 2024

(30) Foreign Application Priority Data

Oct. 21, 2021    (CN) .......................... 202111225795.2

(51) Int. Cl.
*G06T 9/00*         (2006.01)
*G06T 11/00*        (2026.01)
(Continued)

(52) U.S. Cl.
CPC ............... *G06T 9/00* (2013.01); *G06T 11/00* (2013.01); *H04N 13/106* (2018.05);
(Continued)

(58) Field of Classification Search
CPC ......... H04N 2013/0074; H04N 13/106; H04N 13/306; H04N 13/344; H04N 13/194; H04N 13/334; G06T 11/00; G06T 9/00
See application file for complete search history.

(56) References Cited

U.S. PATENT DOCUMENTS

2015/0003532 A1*    1/2015    Fang ....................  H04N 19/139
                                                          375/240.24
2017/0163970 A1      6/2017    Gronholm et al.
(Continued)

FOREIGN PATENT DOCUMENTS

CN       108989784 A      12/2018
CN       109714585 A       5/2019
WO       2019209259 A1    10/2019

OTHER PUBLICATIONS

Desaulniers; Nick, "Stereoscopic Rendering in WebVR", archived on Sep. 19, 2015, https://web.archive.org/web/20150919070555/ https://hacks.mozilla.org/2015/09/stereoscopic-rendering-in-webvr/, accessed on Dec. 10, 2025. (Year: 2015).*
(Continued)

*Primary Examiner* — Kee M Tung
*Assistant Examiner* — Alicia Ha
(74) *Attorney, Agent, or Firm* — Vivacqua Crane, PLLC

(57) ABSTRACT

Disclosed are an image processing method, a cloud server, a Virtual Reality (VR) terminal device, and a storage medium. The method may include: acquiring a first rendered frame and a second rendered frame, wherein the first rendered frame is from the first FOV rendering camera, and the second rendered frame is from the second FOV rendering camera; acquiring difference data from the second rendered frame, wherein the difference data is from an area in the second rendered frame which is not repeated in the first rendered frame; and sending the first rendered frame and the difference data to the VR terminal device such that the VR
(Continued)

Acquire a first rendered frame and a second rendered frame, where the first rendered frame is from the first FOV rendering camera, and the second rendered frame is from the second FOV rendering camera — S110

Acquire difference data from the second rendered frame, where the difference data is from an area in the second rendered frame which is not repeated in the first rendered frame — S120

Send the first rendered frame and the difference data to a VR terminal device such that the VR terminal device restores the second rendered frame according to the first rendered frame and the difference data and obtains a display image according to the first rendered frame and the second rendered frame — S130 terminal device restores the second rendered frame according to the first rendered frame and the difference data and obtains a display image according to the first rendered frame and the second rendered frame.

17 Claims, 10 Drawing Sheets

(51) Int. Cl.

| | |
|---|---|
| *H04N 13/106* | (2018.01) |
| *H04N 13/161* | (2018.01) |
| *H04N 13/194* | (2018.01) |
| *H04N 13/344* | (2018.01) |
| *H04N 13/00* | (2018.01) |

(52) U.S. Cl.
CPC ......... *H04N 13/161* (2018.05); *H04N 13/194* (2018.05); *H04N 13/344* (2018.05); *H04N 2013/0074* (2013.01)

(56) References Cited

U.S. PATENT DOCUMENTS

| | | |
|---|---|---|
| 2020/0092599 A1* | 3/2020 | Chu ........................ A63F 13/35 |
| 2020/0204783 A1 | 6/2020 | Dai et al. |
| 2020/0265618 A1* | 8/2020 | Chen ...................... G16H 50/50 |

OTHER PUBLICATIONS

English translation of CN-109714585-A, Wang; Xue-Feng, May 3, 2019 (Year: 2019).*

European Patent Office. Extended European Search Report for EP Application No. 22882664.0, mailed Jan. 24, 2025, pp. 1-13.

Zhao, S., et al. "Deja View: Spatio-Temporal Compute Reuse for Energy-Efficient 360° VR Video Streaming," 2020 ACM/IEEE 47th Annual International Symposium on Computer Architecture, May 2020, pp. 241-253.

International Searching Authority. International Search Report and Written Opinion for PCT Application No. PCT/CN2022/124175 and English translation, mailed Dec. 13, 2022, pp. 1-10.

* cited by examiner

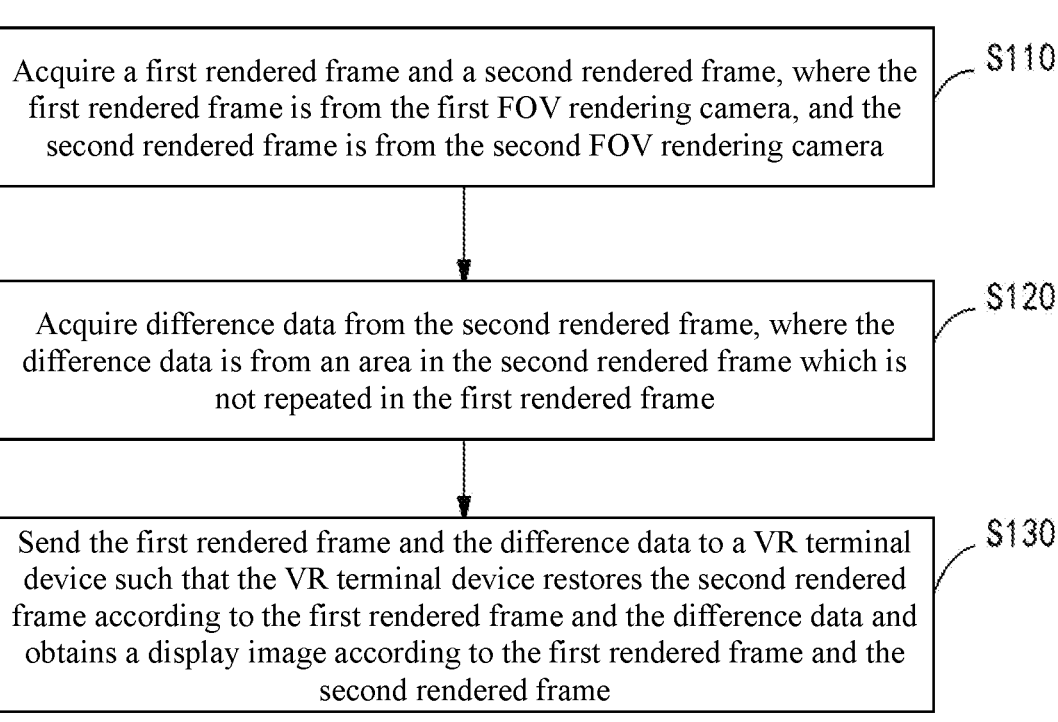

Acquire a first rendered frame and a second rendered frame, where the first rendered frame is from the first FOV rendering camera, and the second rendered frame is from the second FOV rendering camera — S110

Acquire difference data from the second rendered frame, where the difference data is from an area in the second rendered frame which is not repeated in the first rendered frame — S120

Send the first rendered frame and the difference data to a VR terminal device such that the VR terminal device restores the second rendered frame according to the first rendered frame and the difference data and obtains a display image according to the first rendered frame and the second rendered frame — S130

Fig. 1

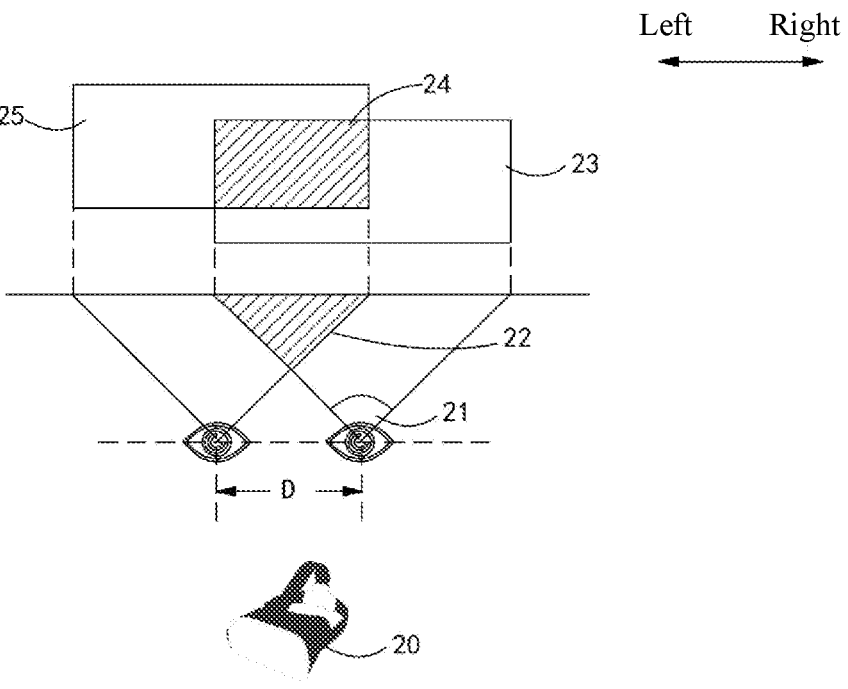

Fig. 2

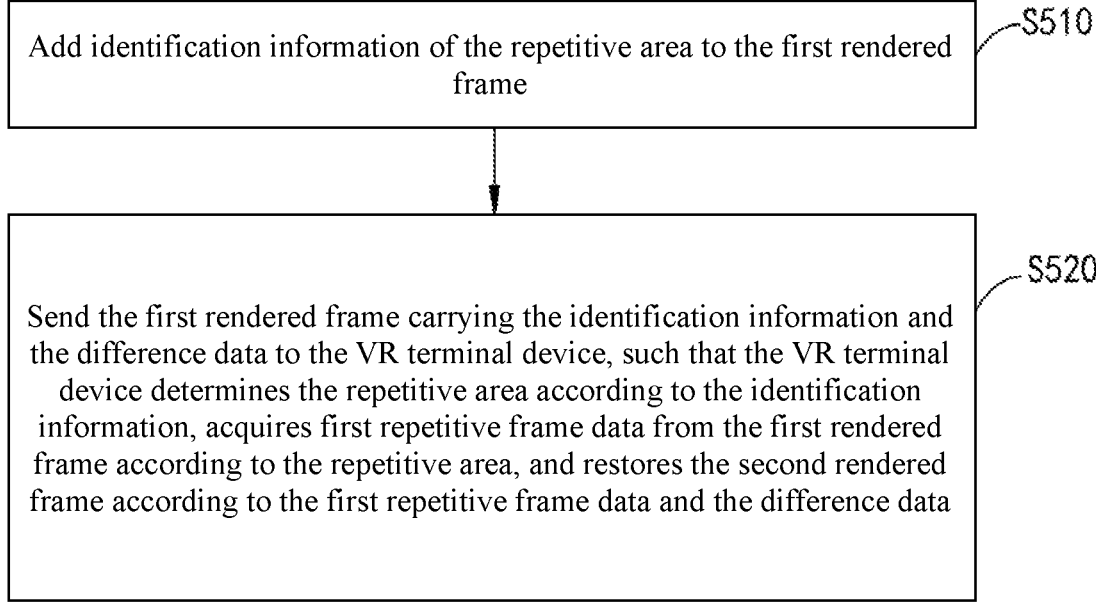

Add identification information of the repetitive area to the first rendered frame — S510

Send the first rendered frame carrying the identification information and the difference data to the VR terminal device, such that the VR terminal device determines the repetitive area according to the identification information, acquires first repetitive frame data from the first rendered frame according to the repetitive area, and restores the second rendered frame according to the first repetitive frame data and the difference data — S520

Fig. 5

Acquire pose update information sent by the VR terminal device — S610

Update the pose matrices according to the pose update information — S620

Fig. 6

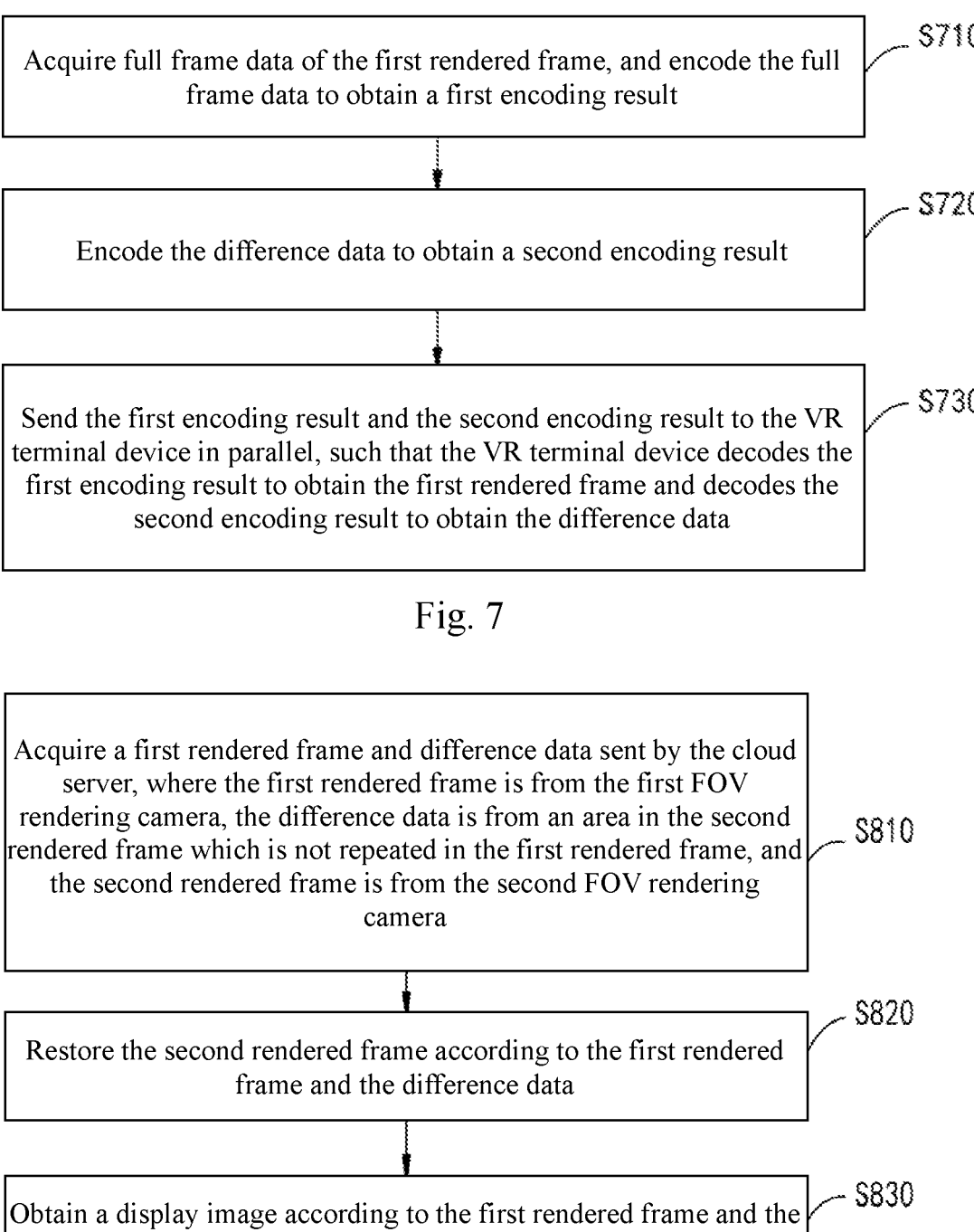

Acquire full frame data of the first rendered frame, and encode the full frame data to obtain a first encoding result — S710

Encode the difference data to obtain a second encoding result — S720

Send the first encoding result and the second encoding result to the VR terminal device in parallel, such that the VR terminal device decodes the first encoding result to obtain the first rendered frame and decodes the second encoding result to obtain the difference data — S730

Fig. 7

Acquire a first rendered frame and difference data sent by the cloud server, where the first rendered frame is from the first FOV rendering camera, the difference data is from an area in the second rendered frame which is not repeated in the first rendered frame, and the second rendered frame is from the second FOV rendering camera — S810

Restore the second rendered frame according to the first rendered frame and the difference data — S820

Obtain a display image according to the first rendered frame and the second rendered frame — S830

Fig. 8

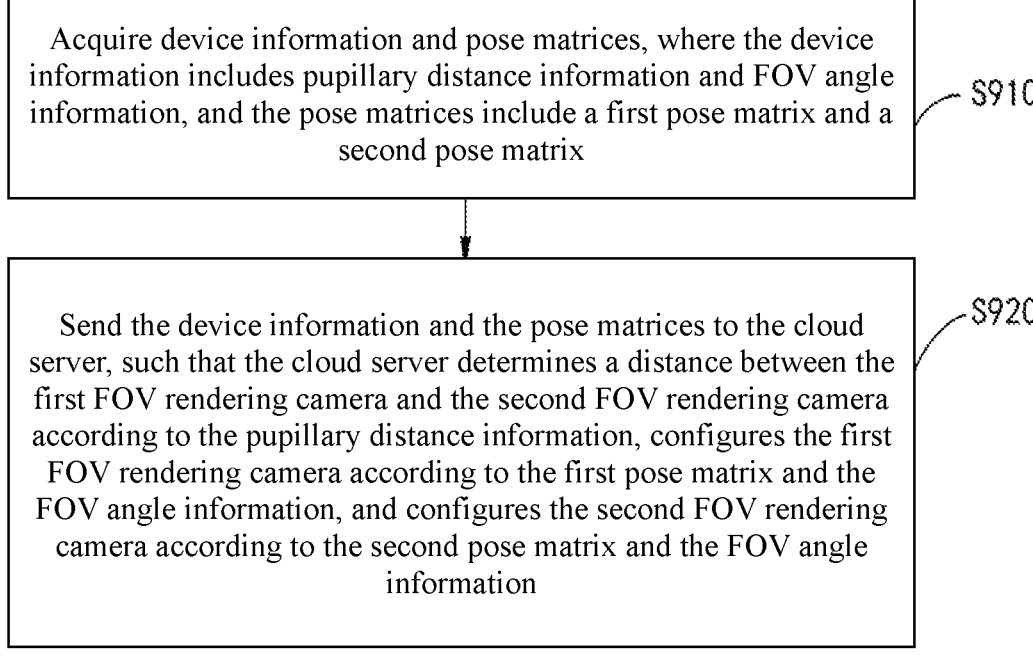

Acquire device information and pose matrices, where the device information includes pupillary distance information and FOV angle information, and the pose matrices include a first pose matrix and a second pose matrix — S910

Send the device information and the pose matrices to the cloud server, such that the cloud server determines a distance between the first FOV rendering camera and the second FOV rendering camera according to the pupillary distance information, configures the first FOV rendering camera according to the first pose matrix and the FOV angle information, and configures the second FOV rendering camera according to the second pose matrix and the FOV angle information — S920

Fig. 9

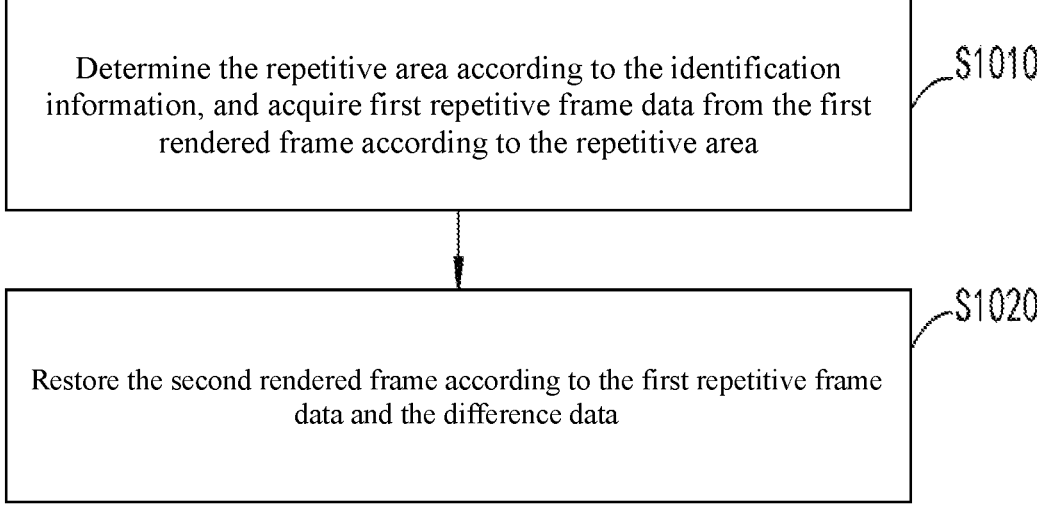

Determine the repetitive area according to the identification information, and acquire first repetitive frame data from the first rendered frame according to the repetitive area — S1010

Restore the second rendered frame according to the first repetitive frame data and the difference data — S1020

Fig. 10

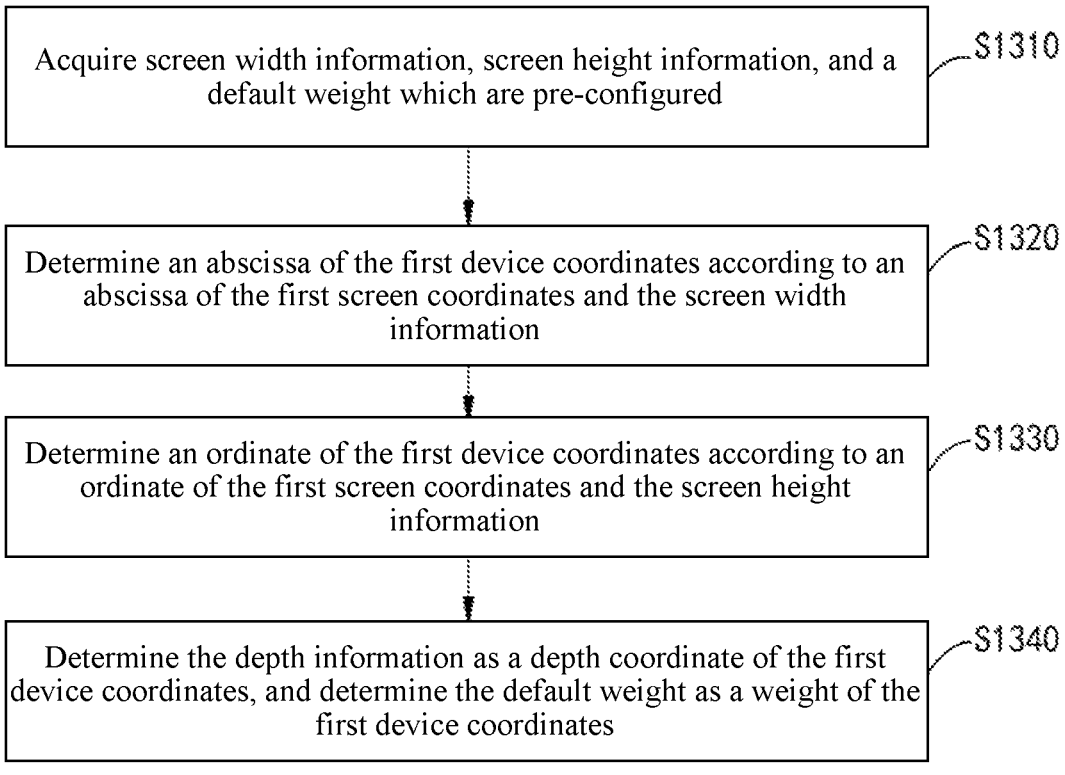

Acquire screen width information, screen height information, and a default weight which are pre-configured — S1310

Determine an abscissa of the first device coordinates according to an abscissa of the first screen coordinates and the screen width information — S1320

Determine an ordinate of the first device coordinates according to an ordinate of the first screen coordinates and the screen height information — S1330

Determine the depth information as a depth coordinate of the first device coordinates, and determine the default weight as a weight of the first device coordinates — S1340

Fig. 13

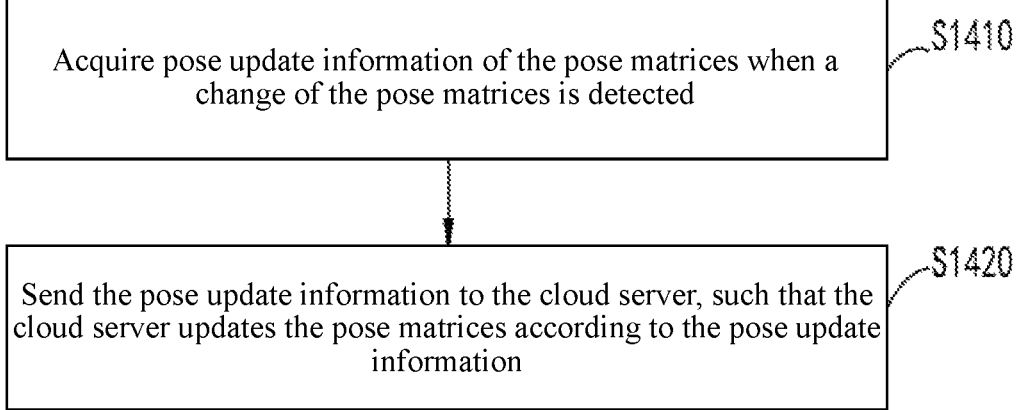

Acquire pose update information of the pose matrices when a change of the pose matrices is detected — S1410

Send the pose update information to the cloud server, such that the cloud server updates the pose matrices according to the pose update information — S1420

Fig. 14

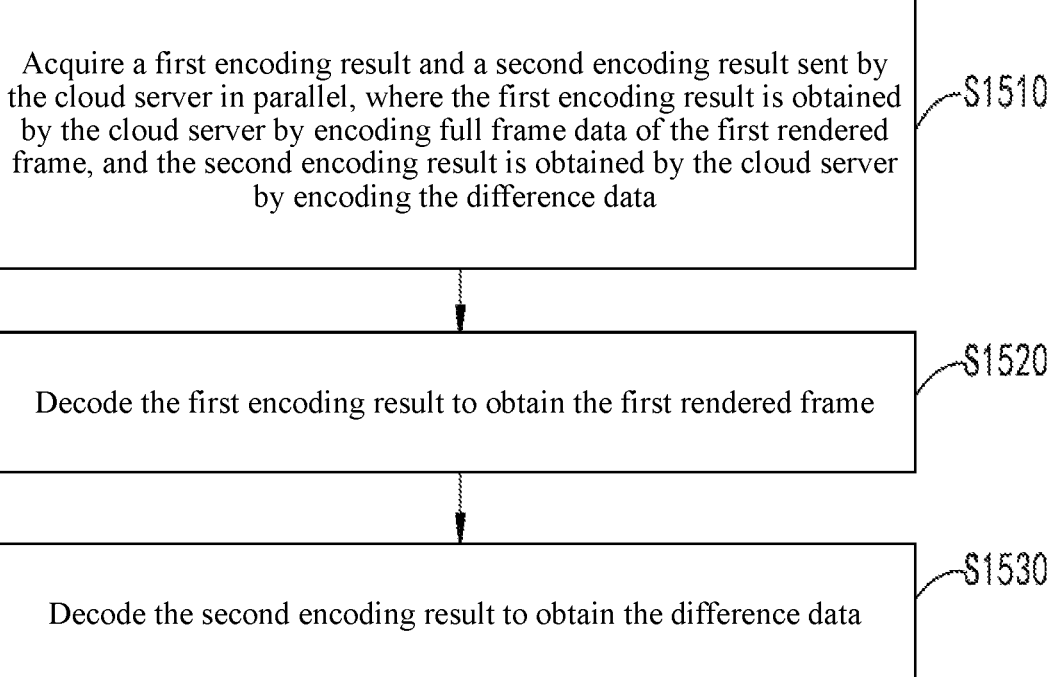

Acquire a first encoding result and a second encoding result sent by the cloud server in parallel, where the first encoding result is obtained by the cloud server by encoding full frame data of the first rendered frame, and the second encoding result is obtained by the cloud server by encoding the difference data     S1510

Decode the first encoding result to obtain the first rendered frame     S1520

Decode the second encoding result to obtain the difference data     S1530

Fig. 15

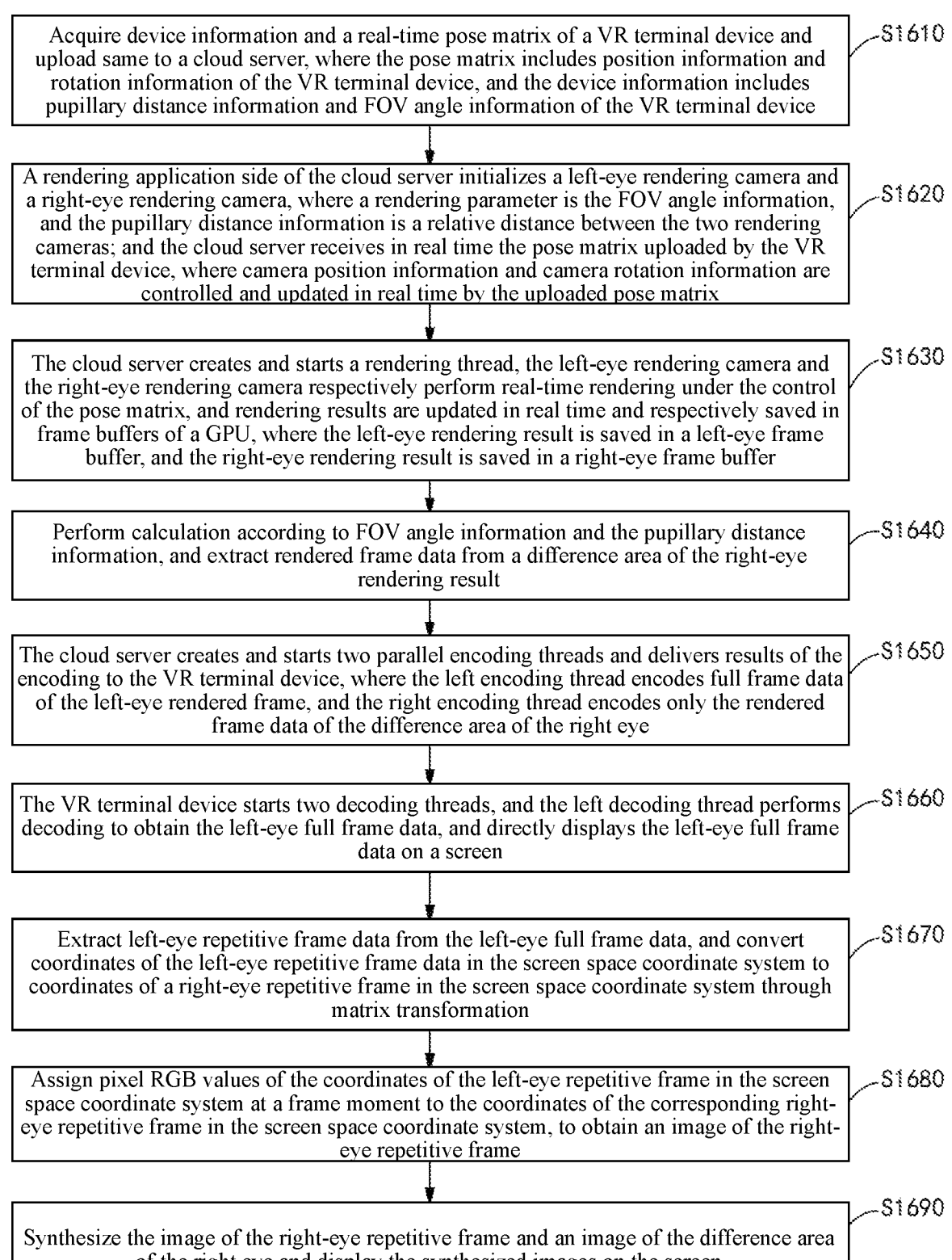

Acquire device information and a real-time pose matrix of a VR terminal device and upload same to a cloud server, where the pose matrix includes position information and rotation information of the VR terminal device, and the device information includes pupillary distance information and FOV angle information of the VR terminal device — S1610

A rendering application side of the cloud server initializes a left-eye rendering camera and a right-eye rendering camera, where a rendering parameter is the FOV angle information, and the pupillary distance information is a relative distance between the two rendering cameras; and the cloud server receives in real time the pose matrix uploaded by the VR terminal device, where camera position information and camera rotation information are controlled and updated in real time by the uploaded pose matrix — S1620

The cloud server creates and starts a rendering thread, the left-eye rendering camera and the right-eye rendering camera respectively perform real-time rendering under the control of the pose matrix, and rendering results are updated in real time and respectively saved in frame buffers of a GPU, where the left-eye rendering result is saved in a left-eye frame buffer, and the right-eye rendering result is saved in a right-eye frame buffer — S1630

Perform calculation according to FOV angle information and the pupillary distance information, and extract rendered frame data from a difference area of the right-eye rendering result — S1640

The cloud server creates and starts two parallel encoding threads and delivers results of the encoding to the VR terminal device, where the left encoding thread encodes full frame data of the left-eye rendered frame, and the right encoding thread encodes only the rendered frame data of the difference area of the right eye — S1650

The VR terminal device starts two decoding threads, and the left decoding thread performs decoding to obtain the left-eye full frame data, and directly displays the left-eye full frame data on a screen — S1660

Extract left-eye repetitive frame data from the left-eye full frame data, and convert coordinates of the left-eye repetitive frame data in the screen space coordinate system to coordinates of a right-eye repetitive frame in the screen space coordinate system through matrix transformation — S1670

Assign pixel RGB values of the coordinates of the left-eye repetitive frame in the screen space coordinate system at a frame moment to the coordinates of the corresponding right-eye repetitive frame in the screen space coordinate system, to obtain an image of the right-eye repetitive frame — S1680

Synthesize the image of the right-eye repetitive frame and an image of the difference area of the right eye and display the synthesized images on the screen — S1690

Fig. 16

IMAGE PROCESSING METHOD, CLOUD SERVER, VR TERMINAL AND STORAGE MEDIUM

CROSS-REFERENCE TO RELATED APPLICATION

This application is a national stage filing under 35 U.S.C. § 371 of international application number PCT/CN2022/124175, filed Oct. 9, 2022, which claims priority to Chinese patent application No. 202111225795.2, filed Oct. 21, 2021. The contents of these applications are incorporated herein by reference in their entirety.

TECHNICAL FIELD

The present disclosure relates to, but not limited to, the field of data processing, and more particularly, to an image processing method, a cloud server, a Virtual Reality (VR) terminal device, and a storage medium.

BACKGROUND

Cloud-based VR technology is a technology for rendering VR applications in clouds by using a cloud-based rendering technology. It can reduce the rendering and calculation load of VR terminal devices, reduce the delay and device power consumption, overcome the limitation of local storage on content resolution, and lower the performance requirements of VR terminal devices. It represents a significant advancement direction in VR technology. A high-bitrate audio/video stream rendered at a cloud needs to be transmitted to a VR terminal device through a network, posing higher requirements on the transmission delay. The end-to-end delay in cloud-based VR is related to many factors such as network transmission efficiency, rendering at the cloud, a coding mode at the cloud, and decoding and rendering at the terminal device.

In conventional cloud-based VR schemes, two transmission schemes, i.e., full view transmission and Field Of View (FOV) transmission, are usually adopted. In the full-view transmission scheme, a cloud transmits all the pictures taken at 360 degrees to a VR terminal device. For this scheme, because encoding and decoding of ultra-high resolution are required, the coding delay, the network transmission delay, and the decoding delay of the VR terminal device increase multiple folds, and higher requirements are posed on hardware resources. The FOV transmission scheme allows for the real-time rendering of pictures according to the user's FOV. Because only pictures related to the user's current FOV are rendered and transmitted, the FOV transmission scheme is much advantageous over the full-view transmission scheme and thus has been widely used.

However, in order to apply the FOV transmission scheme, it is necessary to simulate both eyes for rendering, and then respectively encode and transmit the rendering results of left and right eyes to the VR terminal device, for the VR terminal device to decode and display the rendering results of the left and right eyes. Due to the small pupillary distance between eyes, there is a large proportion of repeated rendering areas between rendered frames of left and right eyes, which results in high encoding and decoding delays and affects the transmission delay.

SUMMARY

The following is a summary of the subject matter set forth in this description. This summary is not intended to limit the scope of protection of the claims.

Embodiments of the present disclosure provide an image processing method, a cloud server, a VR terminal device, and a storage medium, to reduce the amount of data transmitted and the transmission delay.

In accordance with a first aspect of the present disclosure, an embodiment provides an image processing method, applied to a cloud server in communication connection with a VR terminal device, where the cloud server is equipped with a first FOV rendering camera and a second FOV rendering camera, the method including:

acquiring a first rendered frame and a second rendered frame, where the first rendered frame is from the first FOV rendering camera, and the second rendered frame is from the second FOV rendering camera;

acquiring difference data from the second rendered frame, where the difference data is from an area in the second rendered frame which is not repeated in the first rendered frame; and sending the first rendered frame and the difference data to the VR terminal device such that the VR terminal device restores the second rendered frame according to the first rendered frame and the difference data and obtains a display image according to the first rendered frame and the second rendered frame.

In accordance with a second aspect of the present disclosure, an embodiment provides an image processing method, applied to a VR terminal device in communication connection with a cloud server, where the cloud server is equipped with a first FOV rendering camera and a second FOV rendering camera, the method including:

acquiring a first rendered frame and difference data sent by the cloud server, where the first rendered frame is from the first FOV rendering camera, the difference data is from an area in the second rendered frame which is not repeated in the first rendered frame, and the second rendered frame is from the second FOV rendering camera;

restoring the second rendered frame according to the first rendered frame and the difference data; and obtaining a display image according to the first rendered frame and the second rendered frame.

In accordance with a third aspect of the present disclosure, an embodiment provides a cloud server, including: a memory, a processor, and a computer program stored in the memory and executable by the processor, where the computer program, when executed by the processor, causes the processor to implement the image processing method in accordance with the first aspect.

In accordance with a fourth aspect of the present disclosure, an embodiment provides a VR terminal device, including: a memory, a processor, and a computer program stored in the memory and executable by the processor, where the computer program, when executed by the processor, causes the processor to implement the image processing method in accordance with the second aspect.

In accordance with a fifth aspect of the present disclosure, an embodiment provides a computer-readable storage medium, storing a computer-executable instruction which, when executed by a processor, causes the processor to implement the image processing method in accordance with the first aspect or the image processing method in accordance with the second aspect.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and are not intended to limit the technical schemes of the present disclosure.

FIG. 1 is a flowchart of an image processing method applied to a cloud server according to an embodiment of the present disclosure;

FIG. 2 is a schematic diagram of rendering according to another embodiment of the present disclosure;

FIG. 5 is a flowchart of restoring a second rendered frame according to another embodiment of the present disclosure;

FIG. 6 is a flowchart of updating pose matrices according to another embodiment of the present disclosure;

FIG. 7 is a flowchart of encoding and decoding according to another embodiment of the present disclosure;

FIG. 8 is a flowchart of an image processing method applied to a VR terminal device according to another embodiment of the present disclosure;

FIG. 9 is a flowchart of sending device information and pose matrices according to another embodiment of the present disclosure;

FIG. 10 is a flowchart of restoring a second rendered frame according to another embodiment of the present disclosure;

FIG. 13 is a flowchart of obtaining first device coordinates according to another embodiment of the present disclosure;

FIG. 14 is a flowchart of updating pose matrices according to another embodiment of the present disclosure;

FIG. 15 is a flowchart of encoding and decoding according to another embodiment of the present disclosure;

FIG. 16 is a flowchart of a specific example according to another embodiment of the present disclosure;

DETAILED DESCRIPTION

Figure 3:
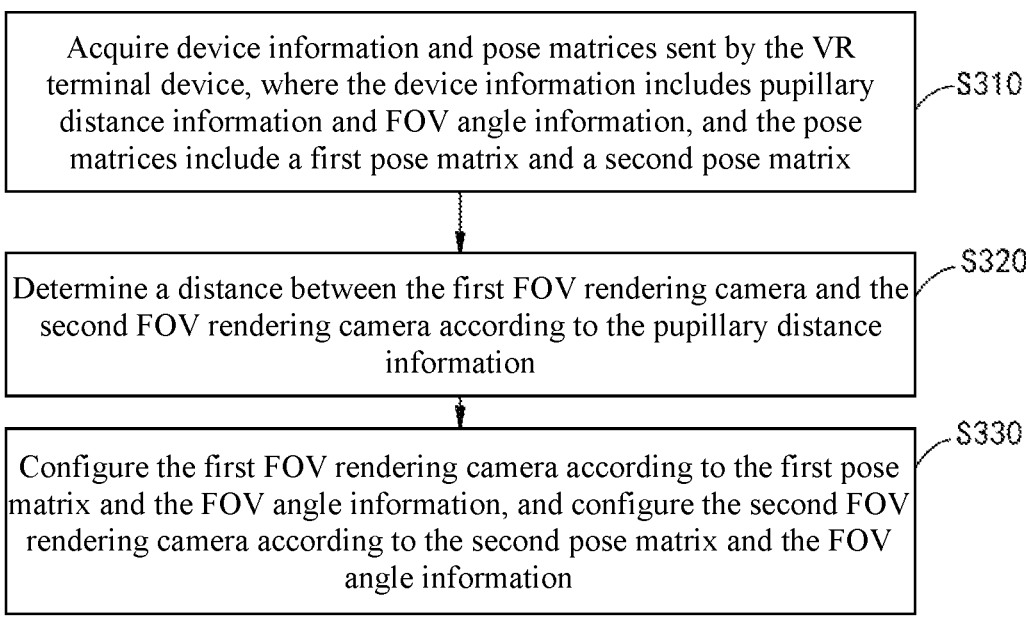
FIG. 3 is a flowchart of configuring rendering cameras according to another embodiment of the present disclosure.

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides an image processing method, a cloud server, a VR terminal device, and a storage medium. The image processing method includes: acquiring a first rendered frame and a second rendered frame, where the first rendered frame is from a first FOV rendering camera, and the second rendered frame is from a second FOV rendering camera; acquiring difference data from the second rendered frame, where the difference data is from an area in the second rendered frame which is not repeated in the first rendered frame; and sending the first rendered frame and the difference data to a VR terminal device such that the VR terminal device restores the second rendered frame according to the first rendered frame and the difference data and obtains a display image according to the first rendered frame and the second rendered frame. With the technical scheme of this embodiment, the data transmission of the overlapping area can be omitted, to reduce the load of image processing and the data amount of the transmitted bitstream, thereby reducing the direct transmission delay between the cloud server and the VR terminal device and improving user experience.

The embodiments of the present disclosure will be further described in detail below in conjunction with the accompanying drawings.

FIG. 1 shows an image processing method according to an embodiment of the present disclosure. The image processing method is applied to a cloud server in communication connection with a VR terminal device. The cloud server is equipped with a first FOV rendering camera and a second FOV rendering camera. The image processing method includes, but not limited to, the following steps S110, S120, and S130.

At S110, a first rendered frame and a second rendered frame are acquired, where the first rendered frame is from the first FOV rendering camera, and the second rendered frame is from the second FOV rendering camera.

It should be noted that a rendering camera is a virtual device in a VR system, and an FOV rendering camera can render an image captured in a virtual scene according to an FOV angle to obtain a rendered picture. The definition of the rendering camera in the VR system is well known to those having ordinary skills in the art, so the details will not be described herein.

It should be noted that for a VR system using the FOV technology, an image needs to be displayed according to the FOV of the user's eyes, so the first FOV rendering camera and the second FOV rendering camera may respectively correspond to the user's eyes. For example, the first FOV rendering camera corresponds to a left eye area, and the second FOV rendering camera corresponds to a right eye area; or the first FOV rendering camera corresponds to the right eye area, and the second FOV rendering camera corresponds to the left eye area. The correspondence between the first FOV rendering camera and the second FOV rendering camera and the eyes in this embodiment is not particularly limited.

It should be noted that the first rendered frame and the second rendered frame in this embodiment are rendered frames at the same frame moment. Because the display image is composed of a plurality of frames of images, the technical scheme of this embodiment may be executed several times when a plurality of consecutive frames are involved, and the details will not be described herein again.

It should be noted that after the first rendered frame and the second rendered frame are obtained by rendering, the first rendered frame and the second rendered frame may be stored in a frame buffer of a Graphics Processing Unit (GPU) in real time. In some embodiments, the first rendered frame and the second rendered frame may respectively be stored in different frame buffers, to facilitate parallel reading and writing. The specific storage mode may be adjusted according to actual requirements.

At S120, difference data is acquired from the second rendered frame, where the difference data is from an area in the second rendered frame which is not repeated in the first rendered frame.

It should be noted that the first FOV rendering camera and the second FOV rendering camera respectively correspond to a left eye and a right eye. Because the pupillary distance of people is limited, the first rendered frame and the second rendered frame do not completely overlap, but have a repetitive area, i.e., an overlapping area. For example, as shown in FIG. 2, the left eye corresponds to the first FOV rendering camera and the right eye corresponds to the second FOV rendering camera. There is a repetitive area 24 between a first rendered frame 25 and a second rendered frame 23 in FIG. 2. If the existing technology is adopted, the first rendered frame and the second rendered frame need to be respectively encoded, decoded, and transmitted, and a large amount of data is involved, which is not conducive to the optimization of the transmission delay. In this embodiment, the difference data is extracted from the second rendered frame, so the amount of data involved in encoding, decoding, and transmission can be effectively reduced.

It should be noted that because the difference data is obtained from an area other than the repetitive area, and the repetitive area is the same for the first rendered frame and the second rendered frame, the difference data may be from either the second rendered frame or the first rendered frame. When the difference data is acquired from the first rendered frame, the full frame data of the second rendered frame is sent to the VR terminal device for subsequent operations. Based on the technical scheme of this embodiment, those having ordinary skills in the art have the motivation to acquire the difference data from any one of the rendered frames and send the full frame data of the other rendered frame to the VR terminal device according to actual requirements, which is not particularly limited herein.

It should be noted that the difference data acquired from the second rendered frame may be display-related parameters of each pixel in the difference area, e.g., coordinates of each pixel and a Red Green Blue (RGB) value of each pixel, as long as the difference data can be used for displaying an image of the difference area.

At S130, the first rendered frame and the difference data are sent to a VR terminal device such that the VR terminal device restores the second rendered frame according to the first rendered frame and the difference data and obtains a display image according to the first rendered frame and the second rendered frame.

It should be noted that the display image of the VR terminal device is obtained by synthesizing the first rendered frame and the second rendered frame, and the full frame data of the first rendered frame is delivered to the VR terminal device by the cloud server. Because the full frame data of the first rendered frame has the difference data, frame data of the repetitive area may be extracted from the first rendered frame, and then combined with the difference data to restore the second rendered frame. The method of combining the frame data of the repetitive area with the difference data is not particularly limited in this embodiment.

It should be noted that after completing the rendering, the cloud server needs to encode the rendering result, and then deliver the encoding result to the VR terminal device through a transmission network. The VR terminal device decodes the encoding result to obtain the display image. With the technical scheme of this embodiment, because the transmission of the data of the area in the second rendered frame which is repeated in the first rendered frame is omitted, the amount of data involved in the encoding stage can be effectively reduced, thereby reducing the amount of data transmitted, effectively reducing the transmission delay, and providing a basis for improving user experience.

In addition, in an embodiment, referring to FIG. 3, before S110 in the embodiment shown in FIG. 1 is executed, the method further includes, but not limited to, the following steps S310, S320, and S330.

At S310, device information and pose matrices sent by the VR terminal device are acquired, where the device information includes pupillary distance information and FOV angle information, and the pose matrices include a first pose matrix and a second pose matrix.

At S320, a distance between the first FOV rendering camera and the second FOV rendering camera is determined according to the pupillary distance information.

At S330, the first FOV rendering camera is configured according to the first pose matrix and the FOV angle information, and the second FOV rendering camera is configured according to the second pose matrix and the FOV angle information.

It should be noted that because different users have different pupillary distances and correspond to different FOV angle information, the device information may be obtained through detection by the VR terminal device. How to acquire the pupillary distance information and the FOV angle information of the user through the VR terminal device during use by the user is well known to those having ordinary skills in the art. For example, referring to FIG. 2, a VR terminal device 20 detects pupillary distance information and a size of an FOV angle 21. When the pupillary distance is defined as D, the distance between the first FOV rendering camera and the second FOV rendering camera is D, and an image is acquired at the FOV angle 21 for rendering. The information acquisition process is not particularly limited in this embodiment, and any acquisition method may be used as long as corresponding information can be acquired.

It should be noted that the pose matrices may each include position information and rotation information of the VR terminal device, and input images of the first FOV rendering camera and the second FOV rendering camera may be determined according to the pose matrices. Therefore, the pose matrices may include the first pose matrix and the second pose matrix respectively corresponding to the left eye area and the right eye area. For example, the first pose matrix corresponds to the left eye area and the second pose matrix corresponds to the right eye area. The pose matrices are not particularly limited in this embodiment and may be adjusted according to configurations of the first FOV rendering camera and the second FOV rendering camera.

It should be noted that after the pose matrices are acquired, the cloud server may create and start a rendering thread, adjust the distance between the first FOV rendering camera and the second FOV rendering camera according to the pupillary distance information to simulate the distance between two eyes, configure the first FOV rendering camera according to the first pose matrix and the FOV angle information, and configure the second FOV rendering camera according to the second pose matrix and the FOV angle information, such that the first FOV rendering camera and the second FOV rendering camera can perform rendering in real time according to configured rendering parameters, to ensure the real-time performance of image display.

Figure 4:
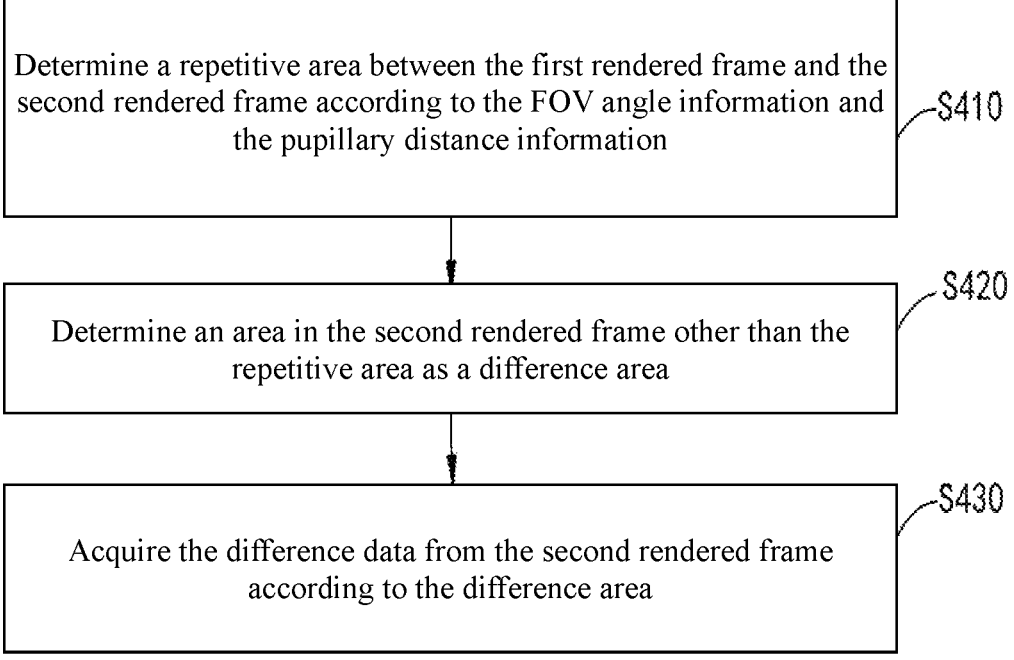
FIG. 4 is a flowchart of acquiring difference data according to another embodiment of the present disclosure.

In addition, in an embodiment, referring to FIG. 4, S120 in the embodiment shown in FIG. 1 further includes, but not limited to, the following steps S410, S420, and S430.

At S410, a repetitive area between the first rendered frame and the second rendered frame is determined according to the FOV angle information and the pupillary distance information.

At S420, an area in the second rendered frame other than the repetitive area is determined as a difference area.

At S430, the difference data is acquired from the second rendered frame according to the difference area.

Referring to FIG. 2, when the pupillary distance D and a value of the FOV angle 21 are known, a side length of a line-of-sight repetitive area 22 is calculated using a trigonometric function, which is well known to those having ordinary skills in the art. Because a side of the line-of-sight repetitive area 22 correspond to a side of the repetitive area 24, a left boundary and a right boundary of the repetitive area 24 can be determined. Then, an upper boundary and a lower boundary of the repetitive area 24 can be determined according to position information between the first rendered frame and the second rendered frame. As such, the repetitive area 24 is determined. In some embodiments, according to the coordinates of each pixel in the first rendered frame and the second rendered frame, an area corresponding to the repeated coordinates may be used as the repetitive area. The method for determining the repetitive area is not particularly limited herein.

It should be noted that after the repetitive area is determined, the area in each of the second rendered frame and the first rendered frame other than the repetitive area is the difference area. When the full frame data of the first rendered frame is transmitted, the difference data may be acquired from the difference area of the second rendered frame and delivered to the VR terminal device. In this way, the amount of data involved in encoding, decoding, and transmission is reduced and the transmission delay is optimized.

In addition, in an embodiment, referring to FIG. 5, S130 in the embodiment shown in FIG. 1 further includes, but not limited to, the following steps S510 and S520.

At S510, identification information of the repetitive area is added to the first rendered frame.

At S520, the first rendered frame carrying the identification information and the difference data are sent to the VR terminal device, such that the VR terminal device determines the repetitive area according to the identification information, acquires first repetitive frame data from the first rendered frame according to the repetitive area, and restores the second rendered frame according to the first repetitive frame data and the difference data.

It should be noted that because the VR terminal device needs to restore the second rendered frame according to the first rendered frame and the difference data after acquiring the data sent by the cloud server, the first repetitive frame data of the repetitive area needs to be extracted from the first rendered frame. Based on this, the identification information of the repetitive area may be added to the first rendered frame. For example, referring to FIG. 2, coordinates of an upper left corner vertex of the repetitive area are carried when the first rendered frame is sent. Because the first rendered frame and the second rendered frame are generally of the same shape and parallel to each other, the repetitive area can be determined when the coordinates of the upper left corner vertex are known. In some embodiments, identification information may be added to the coordinates in the entire repetitive area. The specific identification method is not particularly limited in this embodiment, and any identification method may be used as long as the VR terminal device can determine the repetitive area from the first rendered frame.

It should be noted that although the repetitive area is an overlapping area between frames corresponding to the left and right eyes, imaging of the left eye and imaging of the right eye are not the same but have a mapping relationship, so the first repetitive frame data needs to be converted after being acquired. For example, the first rendered frame corresponds to the left eye, and when the pose matrices are known, the first repetitive frame data is transformed according to the first pose matrix and the second pose matrix to obtain second repetitive frame data corresponding to the right eye, and then the second repetitive frame data is combined with the difference data to obtain the second rendered frame. The calculation method for converting the left eye view to the right eye view may be selected by those having ordinary skills in the art according to actual requirements, which is not particularly limited herein.

In addition, in an embodiment, referring to FIG. 6, after S110 in the embodiment shown in FIG. 1 is executed, the method further includes, but not limited to, the following steps S610 to S620.

At S610, pose update information sent by the VR terminal device is acquired.

At S620, the pose matrices are updated according to the pose update information.

It should be noted that based on the description of the above embodiment, the pose matrix includes the position information and the rotation information of the VR terminal device, and such information will change in actual use by the user. To ensure the accuracy of image rendering, the pose update information reported by the VR terminal device in real time may be acquired to update the pose matrices in real time. The specific form of the pose update information may be adjusted according to actual requirements. Alternatively, real-time pose matrices may be directly reported for replacement. The method of updating the pose matrices is not particularly limited herein.

It should be noted that after the pose matrices are updated, rendering parameters of the first FOV rendering camera and the second FOV rendering camera may be adjusted according to the updated pose matrices, which will not be detailed herein.

In addition, in an embodiment, referring to FIG. 7, S130 in the embodiment shown in FIG. 1 further includes, but not limited to, the following steps S710, S720, and S730.

At S710, full frame data of the first rendered frame is acquired, and the full frame data is encoded to obtain a first encoding result.

At S720, the difference data is encoded to obtain a second encoding result.

At S730, the first encoding result and the second encoding result are sent to the VR terminal device in parallel, such that the VR terminal device decodes the first encoding result to obtain the first rendered frame and decodes the second encoding result to obtain the difference data.

It should be noted that after the difference data is acquired, the cloud server may create and start two encoding threads. One of the encoding threads acquires and encodes the full frame data of the first rendered frame from a GPU buffer storing the first rendered frame. The other encoding thread acquires and encodes the difference data from a GPU buffer storing the second rendered frame. In this way, parallel encoding is realized, thereby improving the encoding efficiency.

It should be noted that because only the difference data is involved in the encoding process of the second rendered frame, the data amount of the second encoding result is effectively reduced, such that the transmission delay can be reduced. In addition, the two encoding results are sent to the VR terminal device in parallel, such that the VR terminal device can decode the two encoding results in parallel, thereby effectively improving the decoding efficiency and the user experience.

In addition, referring to FIG. 8, another embodiment of the present disclosure provides an image processing method, which is applied to a VR terminal device in communication connection with a cloud server. The cloud server is equipped with a first FOV rendering camera and a second FOV rendering camera. The image processing method includes, but not limited to, the following steps S810, S820, and S830.

At S810, a first rendered frame and difference data sent by the cloud server are acquired, where the first rendered frame is from the first FOV rendering camera, the difference data is from an area in the second rendered frame which is not repeated in the first rendered frame, and the second rendered frame is from the second FOV rendering camera.

At S820, the second rendered frame is restored according to the first rendered frame and the difference data.

At S830, a display image is obtained according to the first rendered frame and the second rendered frame.

It should be noted that the technical scheme of this embodiment is similar to the technical scheme described in the embodiment shown in FIG. 1, except that the technical scheme of this embodiment is described with the VR terminal device as the execution entity. The details will not be repeated herein for simplicity of description.

In addition, in an embodiment, referring to FIG. 9, after S810 in the embodiment shown in FIG. 8 is executed, the method further includes, but not limited to, the following steps S910 to S920.

At S910, device information and pose matrices are acquired, where the device information includes pupillary distance information and FOV angle information, and the pose matrices include a first pose matrix and a second pose matrix.

At S920, the device information and the pose matrices are sent to the cloud server, such that the cloud server determines a distance between the first FOV rendering camera and the second FOV rendering camera according to the pupillary distance information, configures the first FOV rendering camera according to the first pose matrix and the FOV angle information, and configures the second FOV rendering camera according to the second pose matrix and the FOV angle information.

It should be noted that the technical scheme of this embodiment is similar to the technical scheme described in the embodiment shown in FIG. 3, except that the technical scheme of this embodiment is described with the VR terminal device as the execution entity. The details will not be repeated herein for simplicity of description.

In addition, in an embodiment, the first rendered frame carries identification information of a repetitive area, the repetitive area is an area in the first rendered frame which is repeated in the second rendered frame, the repetitive area is determined by the cloud server according to the FOV angle information and the pupillary distance information. Referring to FIG. 10, S820 in the embodiment shown in FIG. 8 further includes, but not limited to, the following steps S1010 and S1020.

At S1010, the repetitive area is determined according to the identification information, and first repetitive frame data is acquired from the first rendered frame according to the repetitive area.

At S1020, the second rendered frame is restored according to the first repetitive frame data and the difference data.

It should be noted that the technical scheme of this embodiment is similar to the technical scheme described in the embodiment shown in FIG. 5, except that the technical scheme of this embodiment is described with the VR terminal device as the execution entity. The details will not be repeated herein for simplicity of description.

Figure 11:
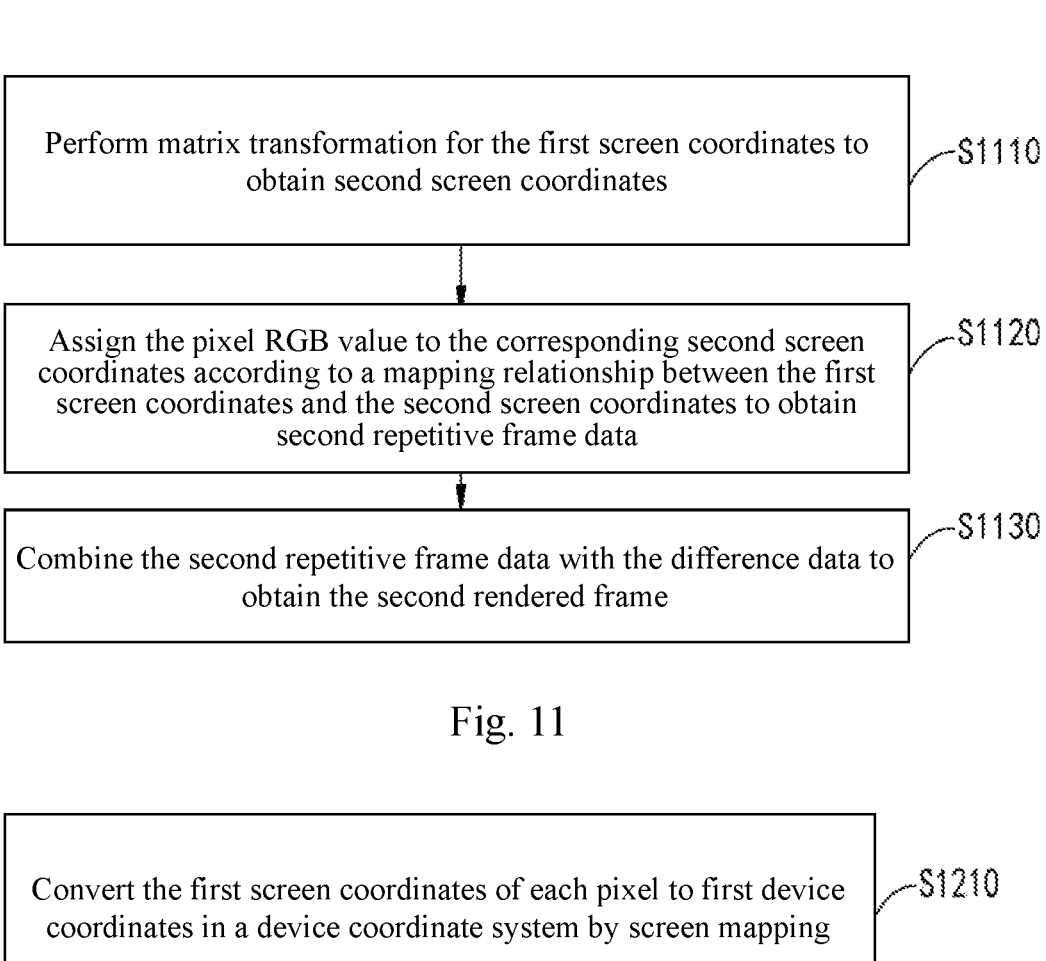
FIG. 11 is a flowchart of restoring a second rendered frame according to another embodiment of the present disclosure.

In addition, in an embodiment, the first repetitive frame data includes first screen coordinates of each pixel in a screen space coordinate system and further includes a pixel RGB value corresponding to the first screen coordinates. Referring to FIG. 11, S1020 in the embodiment shown in FIG. 10 further includes, but not limited to, the following steps S1110, S1120, and S1130.

At S1110, matrix transformation is performed for the first screen coordinates to obtain second screen coordinates.

At S1120, the pixel RGB value is assigned to the corresponding second screen coordinates according to a mapping relationship between the first screen coordinates and the second screen coordinates to obtain second repetitive frame data.

At S1130, the second repetitive frame data is combined with the difference data to obtain the second rendered frame.

It should be noted that the screen space coordinate system is a space coordinate system corresponding to a display screen in the VR terminal device, and the first rendered frame and the second rendered frame may include coordinates corresponding to the screen space coordinate system and an RGB value corresponding to each coordinate, so as to be displayed in the VR terminal device. Although the repetitive area is an overlapping area between the left-eye display image and the right-eye display image, imaging of the left eye and imaging of the right eye are not the same. Because the VR terminal device can rotate, the first rendered frame and the second rendered frame may not be in the same horizontal line. In this case, if the first repetitive frame data is directly combined with the difference data, the display image may be erroneous. When the coordinate system, the pose matrices, and the first screen coordinates are known, the first repetitive frame data may be converted to the second repetitive frame data by matrix transformation, to ensure that the restored image is the second rendered frame.

It should be noted that the first screen coordinates of each pixel of the first repetitive frame data can be converted to the second screen coordinates of the second repetitive frame data through matrix transformation, and the pixel RGB value corresponding to the first screen coordinates is assigned to the second screen coordinates, such that each pixel of the second repetitive frame data has an RGB value, thereby restoring the image of the repetitive area. After the second repetitive frame data is obtained, the second repetitive frame data is combined with the difference data to restore the second rendered frame. Therefore, after completing rendering, the cloud server delivers only the difference data of the second rendered frame, and the second rendered frame can be restored at the VR terminal device, thereby effectively reducing the amount of data involved in encoding, decoding, and transmission.

Figure 12:
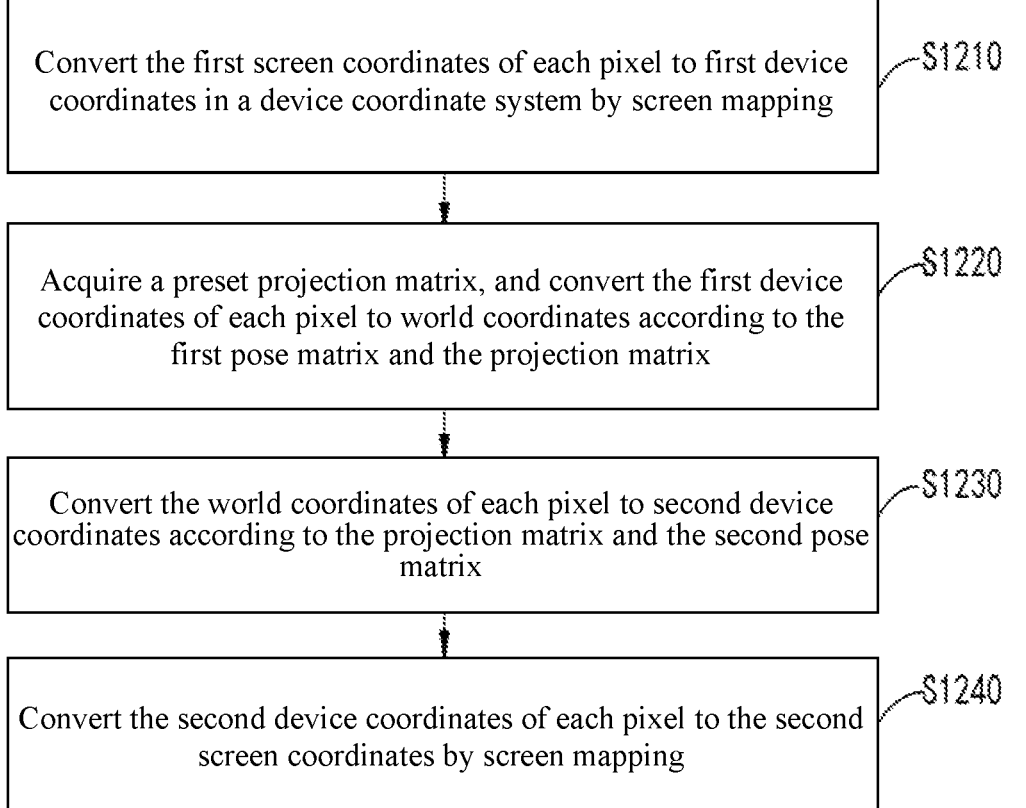
FIG. 12 is a flowchart of obtaining second screen coordinates according to another embodiment of the present disclosure.

In addition, in an embodiment, referring to FIG. 12, S1110 in the embodiment shown in FIG. 11 further includes, but not limited to, the following steps S1210, S1220, S1230, and S1240.

At S1210, the first screen coordinates of each pixel are converted to first device coordinates in a device coordinate system by screen mapping.

At S1220, a preset projection matrix is acquired, and the first device coordinates of each pixel are converted to world coordinates according to the first pose matrix and the projection matrix.

At S1230, the world coordinates of each pixel are converted to second device coordinates according to the projection matrix and the second pose matrix.

At S1240, the second device coordinates of each pixel are converted to the second screen coordinates by screen mapping.

It should be noted that for the VR terminal device, the first pose matrix, the projection matrix, and the second pose matrix can all be acquired, and the specific acquisition method will not be detailed herein.

It should be noted that the VR terminal device not only has the screen space coordinate system, but also has the device coordinate system and the world coordinate system, and all of these coordinate systems are well known to those having ordinary skills in the art, and thus will not be detailed herein.

It should be noted that to convert the first screen coordinates to the second screen coordinates, the first screen coordinates may be converted to the first device coordinates through coordinate system conversion, the world coordinates of each pixel may be obtained according to the mapping relationship between the device coordinate system and the world coordinate system, and then the world coordinates may be converted to the second screen coordinates using the second pose matrix and the projection matrix. To better illustrate the technical scheme of this embodiment, a specific example is described below.

In this example, the first rendered frame corresponds to the left eye, and the second rendered frame corresponds to the right eye. Assuming that coordinates of a left-eye repetitive frame are (X_Left, Y_Left), a left-eye pose matrix M_Left and a projection matrix P are acquired, coordinates in the screen space coordinate system are converted to standardized device coordinates (x_left, y_left, z_left, w_left)$^T$, and then the standardized device coordinates (x_left, y_left, z_left, w_left)$^T$ of each left-eye repetitive frame are converted to coordinates (x_world, y_world, z_world, w_world)$^T$ in the world coordinate system. The specific formula is as follows: (x_world, y_world, z_world, w_world)$^T$=M_Left$^{-1}$×P$^{-1}$×(x_left, y_left, z_left, w_left)$^T$.

In addition, according to a right-eye pose matrix M_right and the projection matrix P, the coordinates (x_world, y_world, z_world, w_world)$^T$ in the world coordinate system are converted to standardized device coordinates (x_right, y_right, z_right, w_right)$^T$ of a right-eye frame. The specific formula is as follows: (x_right, y_right, z_right, w_right)$^T$=M_right×P×(x_world, y_world, z_world, w_world)$^T$.

Finally, the standardized device coordinates of the right-eye frame are converted to the coordinates (X_right, Y_right)$^T$ of the right eye in the screen space coordinate system. The specific formulas are as follows:

$$X\_right = ScreenWidth \times \frac{x\_right + 1}{2}, \text{ and}$$

$$Y\_right = ScreenHeight = \times \frac{y\_right + 1}{2}.$$

In addition, in an embodiment, the first repetitive frame data further includes depth information of each pixel. Referring to FIG. 13, S1210 in the embodiment shown in FIG. 12 further includes, but not limited to, the following steps S1310, S1320, S1330, and S1340.

At S1310, screen width information, screen height information, and a default weight which are pre-configured are acquired.

At S1320, an abscissa of the first device coordinates is determined according to an abscissa of the first screen coordinates and the screen width information.

At S1330, an ordinate of the first device coordinates is determined according to an ordinate of the first screen coordinates and the screen height information.

At S1340, the depth information is determined as a depth coordinate of the first device coordinates, and the default weight is determined as a weight of the first device coordinates.

It should be noted that based on the example of the embodiment shown in FIG. 12, an example is further described below.

The coordinates of the left-eye repetitive frame in the screen space coordinate system are (X_left, Y_left)$^T$. A color buffer ColorBuffer and depth information DepthBuffer are acquired from the left-eye repetitive frame data. A pixel RGB value is acquired according to ColorBuffer. Depths corresponding to coordinate points in the screen space coordinate system are DepthBuffer (X_Left, Y_Left). A screen width ScreenWidth and a screen height ScreenHeight are predefined, where 0≤X_Left≤ScreenWidth, and 0≤Y_Left≤ScreenHeight. Therefore, values of the standardized device coordinates (x_left, y_left, z_left, w_left)$^T$ converted from the coordinates in the screen space coordinate system may be obtained by the following formula:

$$x = 2 \times \frac{X\_left}{ScreenWidth} - 1, \quad y = 2 \times \frac{Y\_left}{ScreenHeight} - 1,$$

z=DepthBuffer(X_Left, Y_Left), and w=1.0, where w represents a weight.

In addition, in an embodiment, referring to FIG. 14, after S810 in the embodiment shown in FIG. 8 is executed, the method further includes, but not limited to, the following steps S1410 to S1420.

At S1410, pose update information of the pose matrices is acquired when a change of the pose matrices is detected.

At S1420, the pose update information is sent to the cloud server, such that the cloud server updates the pose matrices according to the pose update information.

It should be noted that the technical scheme of this embodiment is similar to the technical scheme described in the embodiment shown in FIG. 6, except that the technical scheme of this embodiment is described with the VR terminal device as the execution entity. The details will not be repeated herein for simplicity of description.

In addition, in an embodiment, referring to FIG. 15, S810 in the embodiment shown in FIG. 8 further includes, but not limited to, the following steps S1510, S1520, and S1530.

At S1510, a first encoding result and a second encoding result sent by the cloud server in parallel are acquired, where the first encoding result is obtained by the cloud server by encoding full frame data of the first rendered frame, and the second encoding result is obtained by the cloud server by encoding the difference data.

At S1520, the first encoding result is decoded to obtain the first rendered frame.

At S1530, the second encoding result is decoded to obtain the difference data.

It should be noted that the technical scheme of this embodiment is similar to the technical scheme described in the embodiment shown in FIG. 7, except that the technical scheme of this embodiment is described with the VR terminal device as the execution entity. The details will not be repeated herein for simplicity of description.

In addition, to better illustrate the technical scheme of this embodiment, a specific example is described below. Referring to FIG. 16, the example includes, but not limited to, the following steps S1610 to S1690.

At S1610, device information and a real-time pose matrix of a VR terminal device are acquired and uploaded to a cloud server, where the pose matrix includes position information and rotation information of the VR terminal device, and the device information includes pupillary distance information and FOV angle information of the VR terminal device.

At S1620, a rendering application side of the cloud server initializes a left-eye rendering camera and a right-eye rendering camera, where a rendering parameter is the FOV angle information, and the pupillary distance information is a relative distance between the two rendering cameras; and the cloud server receives in real time the pose matrix uploaded by the VR terminal device, where camera position information and camera rotation information are controlled and updated in real time by the uploaded pose matrix.

At S1630, the cloud server creates and starts a rendering thread, the left-eye rendering camera and the right-eye rendering camera respectively perform real-time rendering under the control of the pose matrix, and rendering results are updated in real time and respectively saved in frame buffers of a GPU, where the left-eye rendering result is saved in a left-eye frame buffer, and the right-eye rendering result is saved in a right-eye frame buffer At S1640, calculation is performed according to FOV angle information and the pupillary distance information, and rendered frame data is extracted from a difference area of the right-eye rendering result.

At S1650, the cloud server creates and starts two parallel encoding threads and delivers results of the encoding to the VR terminal device, where the left encoding thread encodes full frame data of the left-eye rendered frame, and the right encoding thread encodes only the rendered frame data of the difference area of the right eye.

At S1660, the VR terminal device starts two decoding threads, and the left decoding thread performs decoding to obtain the left-eye full frame data, and directly displays the left-eye full frame data on a screen.

At S1670, left-eye repetitive frame data is extracted from the left-eye full frame data, and coordinates of the left-eye repetitive frame data in the screen space coordinate system are converted to coordinates of a right-eye repetitive frame in the screen space coordinate system through matrix transformation.

At S1680, pixel RGB values of the coordinates of the left-eye repetitive frame in the screen space coordinate system at a frame moment is assigned to the coordinates of the corresponding right-eye repetitive frame in the screen space coordinate system, to obtain an image of the right-eye repetitive frame.

At S1690, the image of the right-eye repetitive frame and an image of the difference area of the right eye are synthesized and displayed on the screen.

In an embodiment, a specific implementation of S1670 is as follows.

Data of the left-eye repetitive frame is read. The coordinates of the left-eye repetitive frame in the screen space coordinate system are $(X\_left, Y\_left)^T$, including a color buffer ColorBuffer and depth information DepthBuffer. Depths corresponding to coordinate points in the screen space coordinate system are DepthBuffer $(X\_Left, Y\_Left)$. A screen width ScreenWidth and a screen height ScreenHeight are predefined, where $0 \leq X\_Left \leq ScreenWidth$, and $0 \leq Y\_Left \leq ScreenHeight$. Therefore, values of the standardized device coordinates $(x\_left, y\_left, z\_left, w\_left)^T$ converted from the coordinates in the screen space coordinate system may be obtained by the following formula:

$$x = 2 \times \frac{X\_left}{ScreenWidth} - 1, \quad y = 2 \times \frac{Y\_left}{ScreenHeight} - 1,$$

$z=DepthBuffer(X\_Left, Y\_Left)$, and $w=1.0$.

In an embodiment, according to a left-eye pose matrix M_Left and a projection matrix P, the standardized device coordinates $(x\_left, y\_left, z\_left, w\_left)^T$ of each left-eye repetitive frame are converted to coordinates $(x\_world, y\_world, z\_world, w\_world)^T$ in the world coordinate system. The specific formula is as follows: $(x\_world, y\_world, z\_world, w\_world)^T = M\_Left^{-1} \times P^{-1} \times (x\_left, y\_left, z\_left, w\_left)^T$.

In an embodiment, according to a right-eye pose matrix M_right and the projection matrix P, the coordinates $(x\_world, y\_world, z\_world, w\_world)^T$ in the world coordinate system are converted to standardized device coordinates $(x\_right, y\_right, z\_right, w\_right)^T$ of a right-eye frame. The specific formula is as follows: $(x\_right, y\_right, z\_right, w\_right)^T = M\_right \times P \times (x\_world, y\_world, z\_world, w\_world)^T$.

In an embodiment, the standardized device coordinates of the right-eye frame are converted to the coordinates $(X\_right, Y\_right)^T$ of the right eye in the screen space coordinate system. The specific formulas are as follows:

$$X\_right = ScreenWidth \times \frac{x\_right + 1}{2}, \quad \text{and}$$

$$Y\_right = ScreenHeight = \times \frac{y\_right + 1}{2}.$$

Figure 17:
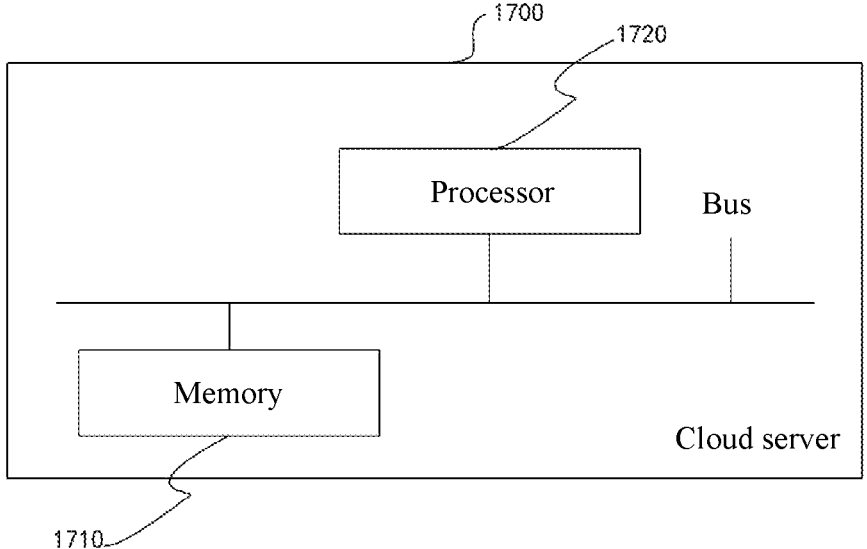
FIG. 17 is a block diagram of a cloud server according to another embodiment of the present disclosure.

In addition, referring to FIG. 17, an embodiment of the present disclosure provides a cloud server 1700, including a memory 1710, a processor 1720, and a computer program stored in the memory 1710 and executable by the processor 1720.

The processor 1720 and the memory 1710 may be connected by a bus or in other ways.

The non-transitory software program and instructions required to implement the image processing method of the foregoing embodiments are stored in the memory 1710 which, when executed by the processor 1720, cause the processor 1720 to implement the image processing method applied to a cloud server in the foregoing embodiments, for example, implement the method steps S110 to S130 in FIG. 1, the method steps S310 to S330 in FIG. 3, the method steps S410 to S430 in FIG. 4, the method steps S510 to S520 in FIG. 5, the method steps S610 to S620 in FIG. 6, or the method steps S710 to S730 in FIG. 7.

Figure 18:
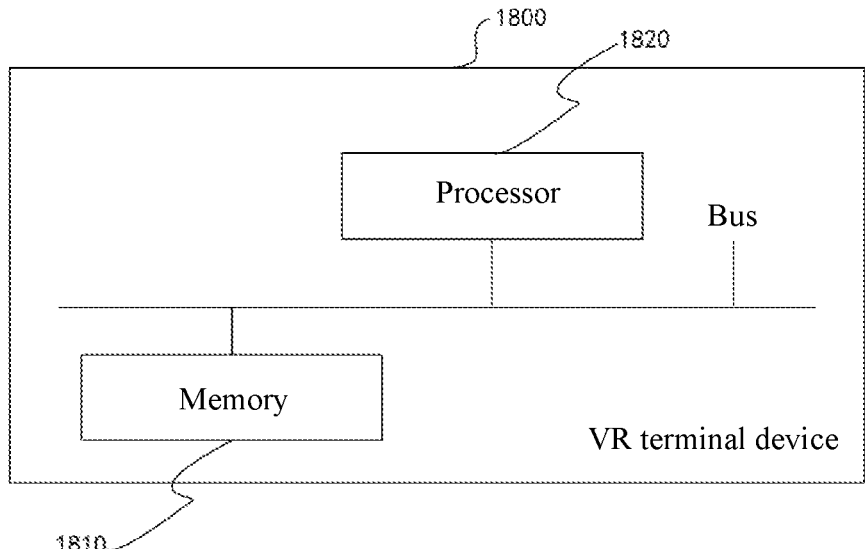
FIG. 18 is a block diagram of a VR terminal device according to another embodiment of the present disclosure.

In addition, referring to FIG. 18, an embodiment of the present disclosure provides a VR terminal device 1800, including: a memory 1810, a processor 1820, and a computer program stored in the memory 1810 and executable by the processor 1820.

The processor 1820 and the memory 1810 may be connected by a bus or in other ways.

The non-transitory software program and instructions required to implement the image processing method of the foregoing embodiments are stored in the memory 1810 which, when executed by the processor 1820, cause the processor 1820 to implement the image processing method applied to a VR terminal device in the foregoing embodiments, for example, implement the method steps S810 to S830 in FIG. 8, the method steps S910 to S920 in FIG. 9, the method steps S1010 to S1020 in FIG. 10, the method steps S1110 to S1130 in FIG. 11, the method steps S1210 to S1240 in FIG. 12, the method steps S1310 to S1340 in FIG. 13, the method steps S1410 to S1420 in FIG. 14, or the method steps S1510 to S1530 in FIG. 15.

The apparatus embodiments described above are merely examples. The units described as separate components may or may not be physically separated, i.e., they may be located in one place or may be distributed over a plurality of network units. Some or all of the modules may be selected according to actual needs to achieve the objects of the scheme of this embodiment.

In addition, an embodiment of the present disclosure provides a computer-readable storage medium, storing a computer-executable instruction which, when executed by a processor or controller, for example, by a processor in the cloud server embodiment described above, may cause the processor to implement the image processing method applied to a cloud server in the foregoing embodiments, for example, implement the method steps S110 to S130 in FIG. 1, the method steps S310 to S330 in FIG. 3, the method steps S410 to S430 in FIG. 4, the method steps S510 to S520 in FIG. 5, the method steps S610 to S620 in FIG. 6, or the method steps S710 to S730 in FIG. 7. For another example, the computer-executable instruction, when executed by a processor in the VR terminal device embodiment described above, may cause the processor to implement the image processing method applied to a cloud server in the foregoing embodiments, for example, implement the method steps S810 to S830 in FIG. 8, the method steps S910 to S920 in FIG. 9, the method steps S1010 to S1020 in FIG. 10, the method steps S1110 to S1130 in FIG. 11, the method steps S1210 to S1240 in FIG. 12, the method steps S1310 to S1340 in FIG. 13, the method steps S1410 to S1420 in FIG. 14, or the method steps S1510 to S1530 in FIG. 15. Those having ordinary skills in the art can understand that all or some of the steps in the methods disclosed above and the functional modules/units in the system and the apparatus may be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some embodiments of the present disclosure have been described above, the present disclosure is not limited to the implementations described above. Those having ordinary skills in the art can make various equivalent modifications or replacements without departing from the essence of the present disclosure. Such equivalent modifications or replacements fall within the protection scope defined by the claims of the present disclosure.

What is claimed is:

1. An image processing method, applied to a cloud server in communication connection with a Virtual Reality (VR) terminal device, wherein the cloud server is equipped with a first Field of View (FOV) rendering camera and a second FOV rendering camera, the method comprising:

acquiring a first rendered frame and a second rendered frame, wherein the first rendered frame is from the first FOV rendering camera, and the second rendered frame is from the second FOV rendering camera;

acquiring difference data from the second rendered frame, wherein the difference data is from an area in the second rendered frame which is not repeated in the first rendered frame; and sending the first rendered frame and the difference data to the VR terminal device such that the VR terminal device restores the second rendered frame according to the first rendered frame and the difference data and obtains a display image according to the first rendered frame and the second rendered frame;

wherein before acquiring the first rendered frame and the second rendered frame, the method further comprises:

acquiring device information and pose matrices sent by the VR terminal device, wherein the device information comprises pupillary distance information and FOV angle information, and the pose matrices comprise a first pose matrix and a second pose matrix;

determining a distance between the first FOV rendering camera and the second FOV rendering camera according to the pupillary distance information; and configuring the first FOV rendering camera according to the first pose matrix and the FOV angle information, and configuring the second FOV rendering camera according to the second pose matrix and the FOV angle information.

2. The method of claim 1, wherein acquiring the difference data from the second rendered frame comprises:

determining a repetitive area between the first rendered frame and the second rendered frame according to the FOV angle information and the pupillary distance information;

determining an area in the second rendered frame other than the repetitive area as a difference area; and acquiring the difference data from the second rendered frame according to the difference area.

3. The method of claim 2, wherein sending the first rendered frame and the difference data to the VR terminal device such that the VR terminal device restores the second rendered frame according to the first rendered frame and the difference data comprises:

adding identification information of the repetitive area to the first rendered frame; and sending the first rendered frame carrying the identification information and the difference data to the VR terminal device, such that the VR terminal device determines the repetitive area according to the identification information, acquires first repetitive frame data from the first rendered frame according to the repetitive area, and restores the second rendered frame according to the first repetitive frame data and the difference data.

4. The method of claim 1, wherein after acquiring the first rendered frame and the second rendered frame, the method further comprises:

acquiring pose update information sent by the VR terminal device; and updating the pose matrices according to the pose update information.

5. The method of claim 1, wherein sending the first rendered frame and the difference data to the VR terminal device comprises:

acquiring full frame data of the first rendered frame, and encoding the full frame data to obtain a first encoding result;

encoding the difference data to obtain a second encoding result; and sending the first encoding result and the second encoding result to the VR terminal device in parallel, such that the VR terminal device decodes the first encoding result to obtain the first rendered frame and decodes the second encoding result to obtain the difference data.

6. An image processing method, applied to a Virtual Reality (VR) terminal device in communication connection with a cloud server, wherein the cloud server is equipped with a first Field of View (FOV) rendering camera and a second FOV rendering camera, the method comprising:

acquiring a first rendered frame and difference data sent by the cloud server, wherein the first rendered frame is from the first FOV rendering camera, the difference data is from an area in the second rendered frame which is not repeated in the first rendered frame, and the second rendered frame is from the second FOV rendering camera;

restoring the second rendered frame according to the first rendered frame and the difference data; and obtaining a display image according to the first rendered frame and the second rendered frame;

wherein before acquiring the first rendered frame and the difference data sent by the cloud server, the method further comprises:

acquiring device information and pose matrices, wherein the device information comprises pupillary distance information and FOV angle information, and the pose matrices comprise a first pose matrix and a second pose matrix; and sending the device information and the pose matrices to the cloud server, such that the cloud server determines a distance between the first FOV rendering camera and the second FOV rendering camera according to the pupillary distance information, configures the first FOV rendering camera according to the first pose matrix and the FOV angle information, and configures the second FOV rendering camera according to the second pose matrix and the FOV angle information.

7. The method of claim 6, wherein the first rendered frame carries identification information of a repetitive area, the repetitive area is an area in the first rendered frame which is repeated in the second rendered frame, the repetitive area is determined by the cloud server according to the FOV angle information and the pupillary distance information, and restoring the second rendered frame according to the first rendered frame and the difference data comprises:

determining the repetitive area according to the identification information, and acquiring first repetitive frame data from the first rendered frame according to the repetitive area; and restoring the second rendered frame according to the first repetitive frame data and the difference data.

8. The method of claim 7, wherein the first repetitive frame data comprises first screen coordinates of each pixel in a screen space coordinate system and further comprises a pixel Red Green Blue (RGB) value corresponding to the first screen coordinates, and restoring the second rendered frame according to the first repetitive frame data and the difference data comprises:

performing matrix transformation for the first screen coordinates to obtain second screen coordinates;

assigning the pixel RGB value to the corresponding second screen coordinates according to a mapping relationship between the first screen coordinates and the second screen coordinates to obtain second repetitive frame data; and combining the second repetitive frame data with the difference data to obtain the second rendered frame.

9. The method of claim 8, wherein performing the matrix transformation for the first screen coordinates to obtain the second screen coordinates comprises:

converting the first screen coordinates of each pixel to first device coordinates in a device coordinate system by screen mapping;

acquiring a preset projection matrix, and converting the first device coordinates of each pixel to world coordinates according to the first pose matrix and the projection matrix;

converting the world coordinates of each pixel to second device coordinates according to the projection matrix and the second pose matrix; and converting the second device coordinates of each pixel to the second screen coordinates by screen mapping.

10. The method of claim 9, wherein the first repetitive frame data further comprises depth information of each pixel, and converting the first screen coordinates of each pixel to the first device coordinates in the device coordinate system by screen mapping comprises:

acquiring screen width information, screen height information, and a default weight which are pre-configured;

determining an abscissa of the first device coordinates according to an abscissa of the first screen coordinates and the screen width information;

determining an ordinate of the first device coordinates according to an ordinate of the first screen coordinates and the screen height information; and determining the depth information as a depth coordinate of the first device coordinates, and determining the default weight as a weight of the first device coordinates.

11. The method of claim 6, wherein after acquiring the first rendered frame and the difference data sent by the cloud server, the method further comprises:

acquiring pose update information of the pose matrices in response to detection of a change of the pose matrices; and sending the pose update information to the cloud server, such that the cloud server updates the pose matrices according to the pose update information.

12. The method of claim 6, wherein acquiring the first rendered frame and the difference data sent by the cloud server comprises:

acquiring a first encoding result and a second encoding result sent by the cloud server in parallel, wherein the first encoding result is obtained by the cloud server by encoding full frame data of the first rendered frame, and the second encoding result is obtained by the cloud server by encoding the difference data;

decoding the first encoding result to obtain the first rendered frame; and decoding the second encoding result to obtain the difference data.

13. A cloud server, comprising: a memory, a processor, and a computer program stored in the memory and executable by the processor, wherein the computer program, when executed by the processor, causes the processor to perform the image processing method of claim 1.

14. A Virtual Reality (VR) terminal device, comprising:

a memory, a processor, and a computer program stored in the memory and executable by the processor, wherein the computer program, when executed by the processor, causes the processor to perform the image processing method of claim 6.

15. A non-transitory computer-readable storage medium, storing a computer-executable instruction which, when executed by a processor, causes the processor to perform an image processing method, applied to a cloud server in communication connection with a Virtual Reality (VR) terminal device, wherein the cloud server is equipped with a first Field of View (FOV) rendering camera and a second FOV rendering camera, the method comprising:

acquiring a first rendered frame and a second rendered frame, wherein the first rendered frame is from the first FOV rendering camera, and the second rendered frame is from the second FOV rendering camera;

acquiring difference data from the second rendered frame, wherein the difference data is from an area in the second rendered frame which is not repeated in the first rendered frame; and sending the first rendered frame and the difference data to the VR terminal device such that the VR terminal device restores the second rendered frame according to the first rendered frame and the difference data and obtains a display image according to the first rendered frame and the second rendered frame;

wherein before acquiring the first rendered frame and the second rendered frame, the method further comprises:

acquiring device information and pose matrices sent by the VR terminal device, wherein the device information comprises pupillary distance information and FOV angle information, and the pose matrices comprise a first pose matrix and a second pose matrix;

determining a distance between the first FOV rendering camera and the second FOV rendering camera according to the pupillary distance information; and configuring the first FOV rendering camera according to the first pose matrix and the FOV angle information, and configuring the second FOV rendering camera according to the second pose matrix and the FOV angle information.

16. The non-transitory computer-readable storage medium of claim 15, wherein acquiring the difference data from the second rendered frame comprises:

determining a repetitive area between the first rendered frame and the second rendered frame according to the FOV angle information and the pupillary distance information;

determining an area in the second rendered frame other than the repetitive area as a difference area; and acquiring the difference data from the second rendered frame according to the difference area.

17. The non-transitory computer-readable storage medium of claim 16, wherein sending the first rendered frame and the difference data to the VR terminal device such that the VR terminal device restores the second rendered frame according to the first rendered frame and the difference data comprises:

adding identification information of the repetitive area to the first rendered frame; and sending the first rendered frame carrying the identification information and the difference data to the VR terminal device, such that the VR terminal device determines the repetitive area according to the identification information, acquires first repetitive frame data from the first rendered frame according to the repetitive area, and restores the second rendered frame according to the first repetitive frame data and the difference data.

* * * * *